United States Patent
Duffy et al.

[15] 3,706,691
[45] Dec. 19, 1972

[54] DEPOTTING SOLVENT

[72] Inventors: James V. Duffy, Beltsville; Porter W. Erickson, Silver Spring, both of Md.

[73] Assignee: The United States of America as represented by the Secretary of the Navy

[22] Filed: Sept. 4, 1970

[21] Appl. No.: 69,958

[52] U.S. Cl. .................252/364, 134/38, 252/171
[51] Int. Cl. ...................B01f 1/00, C23g 5/00
[58] Field of Search...........252/364, 170, 171, 153; 134/38; 260/567.6 M

[56] References Cited

UNITED STATES PATENTS

| | | | |
|---|---|---|---|
| 3,551,204 | 12/1970 | Bolger et al. | 134/38 |
| 2,309,691 | 2/1943 | Brannan | 260/567.6 M |
| 3,373,115 | 3/1968 | Steppan | 252/153 |
| 3,506,828 | 4/1970 | Hansen et al. | 252/364 |

*Primary Examiner*—Leon D. Rosdol
*Assistant Examiner*—William E. Schulz
*Attorney*—R. S. Sciascia and J. A. Caske

[57] ABSTRACT

Encapsulating (potting) compositions which contain a linkage that is susceptible to hydrolytic cleavage; i.e., polyamides, polyesters and polyester base type polyurethanes, and which have deteriorated due to exposure to a hot, moist atmosphere are dissolved by contacting with a solvent comprising a solution of benzyltrimethylammonium hydroxide preferably containing a constituent selected from the group consisting of (a) tetrahydrofuran and acetone, (b) methylene chloride (c) methylene chloride and acetone and (d) N-methyl-2-pyrollidone.

10 Claims, No Drawings

DEPOTTING SOLVENT

BACKGROUND OF THE INVENTION

This invention generally relates to solvents and more particularly to solvents to dissolve deteriorated encapsulating (potting) compositions.

It is a common practice in the prior art to encapsulate (or pot) electrical components such as connectors, relays, circuit assemblies etc to provide electrical insulation, mechanical support and protection from moisture. However, when certain types of potting compositions are exposed to hot, humid environments, they deteriorate and revert to gums or viscous liquids depending on the degree of deterioration. When this occurs in electrical applications, such as connectors, the insulation values between the various electrical components such as the wires leading into the connectors, is seriously reduced and the moisture barrier function of the potting composition may be completely lost. Additionally, the liquid or gum may run over other wires or components thereby creating problems in other parts of the electrical system. The most common present day method of rectifying this situation is to depot or dissolve out the deteriorated encapsulating material and to repot the unit. It is of course very important to remove entirely the deteriorating encapsulating composition so that no further adverse effects will result from these compositions if they are again exposed to hot, humid environments.

Up to now, all solvent systems which dissolve and completely remove these encapsulating materials have been based on various formulations of methanol, methylene chloride and potassium hydroxide. The latter, being strongly ionic, interacts with methylene chloride and also with products from the hydrolysis of the potting compounds to produce highly insoluble salt-like residues which are deposited on all available surfaces in and on the electrical component. These are extremely difficult to wash off with the result that the insulation resistances between the constituent parts of the electric system are unacceptably low. Other solvent systems have been used which do not dissolve the potting material but which swell and deteriorate it so that it can be removed by blunt probes, such as picks. This "soak and pick" system does not lead to low insulation resistance since potassium hydroxide or other alkali is not part of this system. It is however, slow and requires manual removal of the swollen material. This becomes a hazardous operation because of the constant long-time expose of personnel to the vapors of methylene chloride or dimethylformamide.

SUMMARY OF THE INVENTION

Accordingly, one object of this invention is to provide a solvent which can dissolve deteriorated encapsulating compositions which have been exposed to hot, moist environments.

Another object of the present invention is to provide a solvent which rapidly dissolves deteriorated encapsulating compositions.

A further object of the instant invention is to provide a solvent for dissolving deteriorated encapsulating compositions which will not damage components of electrical devices which have been encapsulated with said encapsulating composition.

A still further object of this invention is to provide a solvent which can dissolve deteriorated encapsulating compositions without leaving traces of insoluble salt-like residues which are deleterious to electrical insulation.

Another object of this invention is to provide a solvent which can dissolve deteriorated encapsulating compositions which are relatively safe to use.

A still further object of this invention is to provide a method for the removal of deteriorated encapsulating compositions.

Another still further object of the present invention is to provide a solvent for dissolving the environmentally deteriorated encapsulating compositions in electric connectors.

These and other objects of this invention are accomplished by providing a solvent comprising a solution of benzyltrimethylammonium hydroxide which preferably contains a constituent selected from the group consisting of (a) tetrahydrofuran and acetone, (b) methylene chloride, (c) methylene chloride and acetone and (d) N-methyl-2-pyrollidone.

DESCRIPTION OF THE PREFERRED EMBODIMENT

The solvent solutions of this invention are capable of rapidly and efficiently dissolving potting compositions which have deteriorated due to exposure to moist, hot environment such as for example the environment found in tropical regions. It is to be understood that within the meaning of this invention the terms "potting composition" and "encapsulating compositions" are used as equivalents and apply only to potting or encapsulating composition which contain linkages susceptible to hydrolytic cleavage, such as, for example, polyamides, polyesters and polyester base type polyurethanes.

All the solvents are based on the use of benzyltrimethylammonium hydroxide but the preferred solvents also include another constituent. The solvent solution which utilizes N-methyl-2-pyrollidone is the most preferred system for a number of reasons. First, unlike the methylene chloride containing solutions which generally must be used within 24 hours of mixing so as to avoid any consequences of decomposition, the N-methyl-2-pyrollidone system is extremely stable for long periods of time. The tetrahydrofuran-acetone system is stable for long periods of time but is somewhat hazardous to use because of the low flash point of THF. Similarly prolonged exposure to methylene chloride is also to be avoided since it is known to have detrimental effects on those who have been exposed to it for long periods of time. On the other hand N-methyl-2-pyrollidone is not considered to be dangerous, has a high flash point (204° F) low toxicity and is chemically stable.

The deteriorated potting compositions are dissolved merely by immersion in the solvent. As will be recognized by those skilled in the art, agitation will increase the rate of dissolution but excellant dissolving action is obtained even in static systems. It is also possible to add other constituents such as water or surfactants used in the dry cleaning arts to the solvent compositions of this invention but such materials are not necessary and do not greatly enhance the solvating power of the instant solvents.

The general nature of the invention having been set forth, the following examples are presented as specific illustrations thereof. It will be understood that the invention is not limited to these specific examples but is susceptible to various modifications that will be recognized by one of ordinary skill in the art.

The following is a list of typical solvent solutions which have successfully been used to depot potting compositions which contain a linkage that is susceptible to hydrolytic cleavage and which have been exposed to hot, humid environments.

| Constituent | Amount in Ml | | | | | |
|---|---|---|---|---|---|---|
| | 1 | 2 | 3 | 4 | 5 | 6 |
| benzyltrimethylammonium hydroxide as a 40% solution in methanol | 35 | 75 | 50 | 10 | 25 | 50 |
| methylene chloride | 160 | 200 | | | | |
| acetone | 40 | | 30 | | | |
| tetrahydrofuran | | | 120 | | | |
| N-methyl-2-pyrollidone | | | | 190 | 175 | 150 |
| DMP-10 Surfactant (Rohm & Haas) | | | 2 drops | | | |

Solutions 1 and 2 were used to depot 90 percent of electrical connectors potted with Pro-Seal 777 (Coast Pro Seal Co.) and EC 2273 (3M Co.) in only 120 minutes. Solution 3 completely dissolved a 15g sample of EC 2273 within 90 minutes while solutions 5 and 6 depotted 77 percent and 96 percent respectively of an electrical connector potted with EC 2273 under static conditions in 6 hours. The pure amine (50 ml of the 40 percent solution) was only capable of depotting 55 percent of an electrical connector potted with EC 2273 in 6 hours. The most preferred solvent solution is the mixture of benzyltrimethylammonium hydroxide and N-methyl-2-pyrollidone in a weight ratio of from about 0.06 to 0.2 parts of pure hydroxide to 1 part N-methyl-2-pyrollidone.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A solvent consisting essentially of benzyltrimethylammonium hydroxide and a constituent selected from the group consisting of (a) tetrahydrofuran and acetone, (b) methylene chloride, (c) methylene chloride and acetone, and (d) N-methyl-2-pyrollidone.

2. solvent according to claim 1 which consists essentially of benzyltrimethyl-ammonium hydroxide and N-methyl-2-pyrollidone.

3. A solvent according to claim 2 wherein between about 0.06 – 0.2 parts by weight of benzyltrimethylammonium hydroxide are present per part of N-methyl-2-pyrollidone.

4. A method of dissolving potting compositions consisting essentially of contacting said potting composition with a solvent comprising a solution of benzyltrimethylammonium hydroxide and methanol.

5. A method according to claim 4 within said solvent contains a constituent selected from the group consisting of (a) tetrahydrofuran and acetone, (b) methylene chloride, (c) methylene chloride and acetone and (d) N-methyl-2-pyrollidone.

6. A method according to claim 5 wherein said solvent consists essentially of benzytrimethylammonium hydroxide and N-methyl-2-pyrollidone.

7. A method according to claim 6 wherein between about 0.06 – 0.2 parts by weight of benzyltrimethylammonium hydroxide are present per part of N-methyl-2-pyrollidone.

8. A solvent according to claim 1 which additionally contains methanol.

9. A solvent according to claim 2 which additionally contains methanol.

10. A solvent according to claim 3 which additionally contains methanol.

* * * * *